March 19, 1946.  D. G. C. HARE ET AL  2,397,074
RADIATION DETECTOR
Filed Oct. 16, 1941  2 Sheets-Sheet 1

D.G.C. Hare
G. Herzog
INVENTORS

March 19, 1946.　　D. G. C. HARE ET AL　　2,397,074
RADIATION DETECTOR
Filed Oct. 16, 1941　　2 Sheets-Sheet 2

D.G.C.Hare
G.Herzog
INVENTORS

BY R.J.Dearborn
Daniel Stryker
HIS ATTORNEY

Patented Mar. 19, 1946

2,397,074

UNITED STATES PATENT OFFICE 2,397,074

RADIATION DETECTOR

Donald G. C. Hare and Gerhard Herzog, Houston, Tex., assignors, by mesne assignments, to The Texas Company, New York, N. Y., a corporation of Delaware Application October 16, 1941, Serial No. 415,194

6 Claims. (Cl. 250—83.6)

This invention relates to the detecting and measurement of penetrative radiation, and more particularly to a device of the Geiger-Muller counter type for measuring the intensity of such radiation as gamma rays.

The principal object of the invention is to provide a device of this type which will have an efficiency much higher than the ordinary or conventional Geiger-Muller counter, which will be relatively simple to manufacture and which will have substantially no fragile parts so that it will be sufficiently rugged and stable in operation to enable it to be used in comparatively rough service, such as, for instance, the logging of wells or bore holes.

In making intensity measurements of such radiation as gamma rays, it is frequently desirable or necessary to use a detecting device of the Geiger-Muller counter type. The common Geiger-Muller counter usually comprises a cylinder of metal forming the cathode, sealed within a glass envelope and through the center of which cylinder is disposed a wire forming the anode. The envelope contains a suitable gas such as argon at a fairly low pressure of from 5 to 10 cms. of mercury, and the anode wire is maintained at a positive potential with respect to the cylinder. Normally the potential difference between the cathode and the anode is nearly but not quite high enough to cause a discharge to take place. If a particle capable of ionizing the gas passes through the cathode cylinder ionization of the gas will take place and a discharge will occur. The anode and cathode may be connected to a suitable amplifier and a recording instrument capable of registering the discharge of the counter. This type of counter is useful in many instances but in common with nearly all devices for detecting the presence of gamma rays it has a very low efficiency. An increase in this efficiency is very desirable, since for a given intensity of radiation the time necessary to obtain a measurement to a desired accuracy will vary directly with the efficiency.

In our co-pending patent application filed November 2, 1940, Serial No. 364,020, there is disclosed a device for detecting penetrative radiation, such as gamma rays, which device has an efficiency many times that of the devices known to the prior art. The device disclosed in that application is formed of two or more elongated parallel metal plates connected together electrically to form a cathode and separated in position so as to form a relatively small space. In this space are disposed a plurality of fine wires stretched parallel to the cathode plates and forming the anode of the device. The anode wires positioned in this manner provide the proper type of concentration or inhomogeneity of the field. Counters of this type have been constructed and found to be very satisfactory, having an efficiency many times that of the common Geiger-Muller counter.

The present invention relates to a device of the general type disclosed in the aforementioned co-pending application, having the advantage of high efficiency of that device and also other advantages not inherent in that device. Of particular value is the simplification of construction and an increased ruggedness resulting from larger permissible manufacturing tolerances.

In accordance with the present invention, a radiation detecting device is formed of a plurality of thin metal plates which may be substantially circular in shape and which are supported in a suitable framework in parallel separated relation. A second frame-work disposed at right angles to the cathode frame serves to support a plurality of anode wires extending through the spaces between adjacent cathode plates and parallel to those plates. It is preferred to use one wire between each pair of cathode plates, this wire passing back and forth through the space between the plates and supported by the anode frame-work. The cathode and anode frames are electrically insulated from each other and are mounted within a housing or envelope adapted to contain a suitable gas under a desired pressure.

For a better understanding of the invention reference may be had to the accompanying drawings in which Fig. 1 is a sectional elevation through a device of the preferred type;

Figure 3:
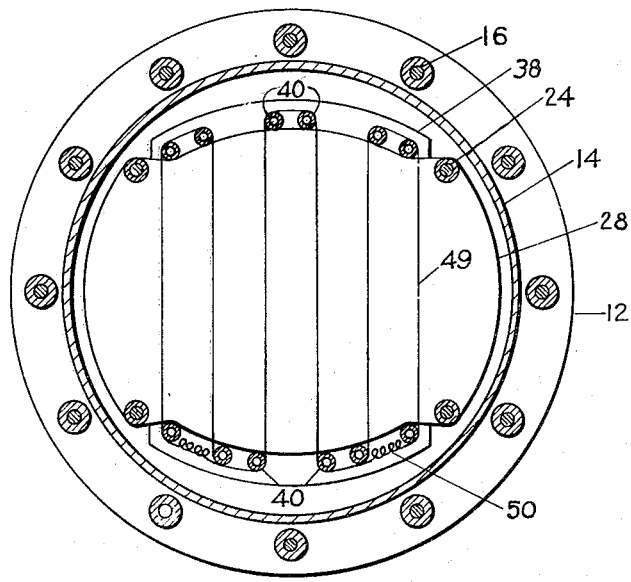
Fig. 3 is a sectional plan view taken on line 3—3 of Fig. 1.
Figure 4:
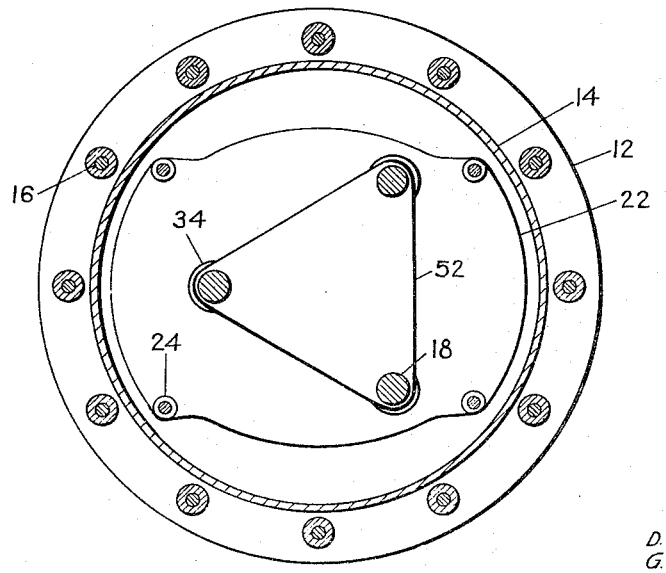
Fig. 4 is a sectional plan view on the line 4—4 of Fig. 1.

Referring to the drawings, a housing comprising an upper plate 10, a lower plate 12 and a cylinder 14 is adapted to be maintained gas tight by means of suitable bolts 16 holding the top and bottom plates against the cylinder 14. A pair of leg supports, preferably formed by bolts 18, are attached to the bottom plate 12 and serve to support the cathode and anode frame-works within the housing. The cathode frame comprises upper and lower discs or plates 20 and 22, respectively, the upper plate being maintained in position by means of separator bolts 24. The bolts 24 are provided with a plurality of separator members 26 which serve to hold in spaced parallel relation a plurality of thin metal plates 28 forming the cathode of the device. As shown in Fig. 3, the cathode plates are more or less circular in shape and provided with oppositely disposed extensions, having holes through which the bolts 24 are passed. The separators 24 may be of metal and in this manner the cathode plates are connected together electrically. A lead wire 30 shown as connected to the plate 22 passes through an insulating bushing 32 in the bottom supporting plate 12. The lower plate 22 of the cathode frame is supported between pairs of insulators 34 so that the cathode will be electrically insulated from the other parts of the device and from the housing in case that element is of metal.

The anode frame-work also comprises an upper plate or disc 36 and a lower plate 38, the upper plate being maintained in position by means of a plurality of rods 40. The rods 40 are disposed in two groups and the shape of the plates 36 and 38 is such that the rods 40 may be disposed perpendicularly and at opposite sides of the cathode plates 28. As will be observed in viewing Figure 2 the anode framework is substantially rectangular and is disposed more or less within the cathode frame which is also rectangular as will be seen in Figure 1. The lower anode plate 38 is supported from the bolts 18 between insulators 42 so that the anode frame will be suitably electrically insulated. A lead wire 44 which may be connected to the plate 38 passes through an insulating bushing 46 in the lower supporting plate 12.

Each of the rods 40 is preferably provided with small grooves 48, and a fine tungsten wire 49 is stretched back and forth through the spaces between the cathode plates and around the rods 40 in the grooves 48 in the shape of a grid formed of parallel wire sections, as shown more clearly in Fig. 3. In order to maintain the anode wires taut, small tension springs 50 are connected preferably between the ends of each wire and another section of the wire or to an adjacent rod or post 40, thus maintaining the wire under predetermined tension.

A guard plate 52 may, if desired, be disposed between the adjacent insulators 34 and 42 and maintained at any desired intermediate voltage so as to minimize or prevent back-ground noise which may occur due to electrical leakage between the cathode and anode frames. An electrical lead 54 also extends from the plate 52 outwardly of the device through a suitable insulating bushing 56.

Figure 1:
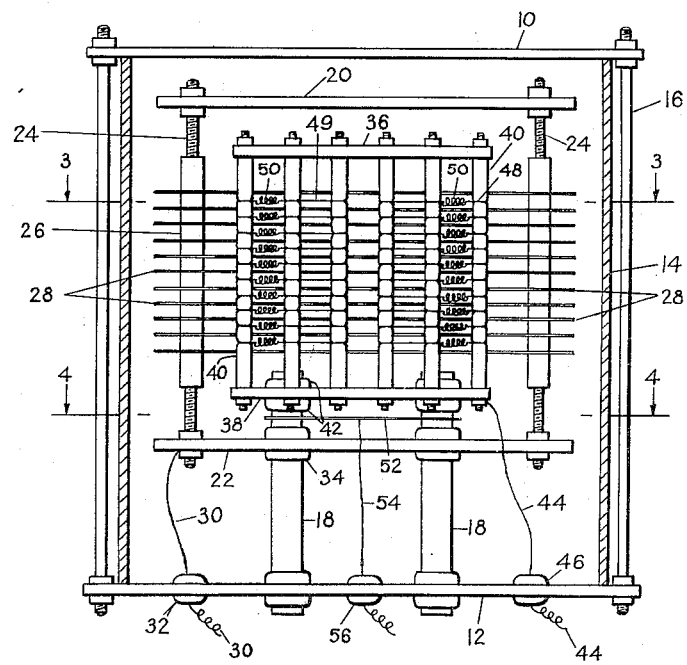
Figure 2:
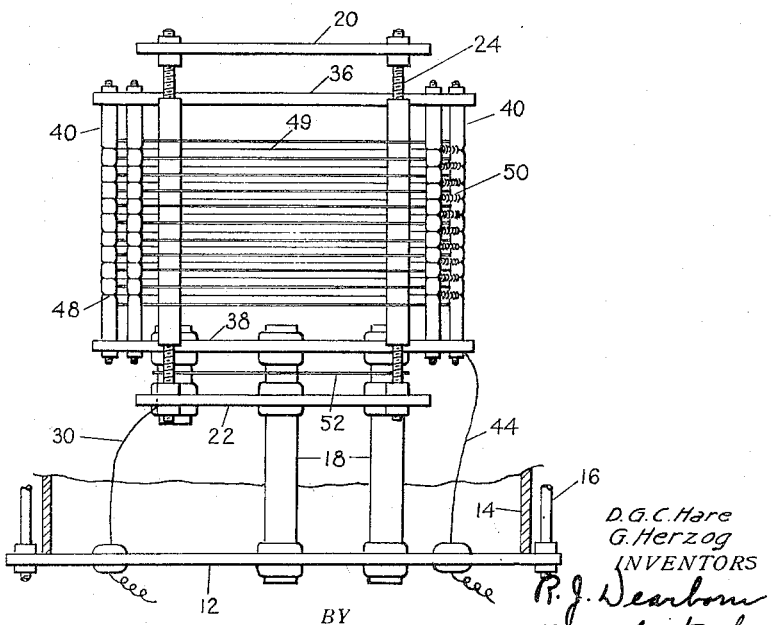
Fig. 2 is a side view of the device of Fig. 1 but with the housing removed.

It is believed obvious that with the construction shown and described, a very sturdy and easy to assemble detecting device has been provided. Because of the round or substantially cylindrical shape of the device, it is ideally adapted to the logging of bore holes, in which case it is necessary to lower the instrument into and through the hole. If desired, several of the units such as is shown in Fig. 1 can be disposed one on top of the other so as to increase still further the efficiency of the instrument. It is intended, of course, as described hereinbefore in referring to the common Geiger-Müller counter, to connect the leads 30 and 44 in series with an electrical resistance, not shown, and a source of electrical potential of, say, 1000 volts. A gamma ray on entering the device and striking one or more of the cathode plates 28 will cause electrons to be ejected into the gas within the device to ionize the gas, causing a potential drop across the resistance which may serve to actuate a suitable recording device.

Obviously many modifications and variations of the invention, as hereinbefore set forth, may be made without departing from the spirit and scope thereof and, therefore, only such limitations should be imposed as are indicated in the appended claims.

We claim:

1. A detector of gamma radiation comprising a substantially rectangular frame, a second substantially rectangular frame within and at right angles to said first frame, said second frame being electrically insulated from the first mentioned frame, a plurality of cathode plates supported in parallel spaced relation by two opposite sides of the first frame, and a plurality of anode wires supported by two opposite sides of said second frame, said wires passing between and parallel to said cathode plates.

2. A detector of gamma radiation comprising a plurality of cathode plates, a plurality of separator bolts passing through opposite outer portions of said plates for holding the plates in parallel separated relation, a plurality of rods disposed parallel to said bolts at opposite sides of said cathode plates, and a plurality of anode wires stretched between said rods in planes parallel to and midway between adjacent pairs of cathode plates.

3. A detector of gamma radiation comprising a plurality of cathode plates, means comprising a plurality of separator bolts passing through the outer portions of said plates at opposite sides thereof for holding the plates in parallel separated relation, a plurality of elongated supporting members disposed parallel to said bolts near opposite sides of said cathode plates and between said separator bolts, and a plurality of anode wires stretched between said rods between adjacent pairs of cathode plates.

4. A detector of gamma radiation comprising a housing, a framework supported within said housing, said framework comprising a pair of plate members held in separated position by a plurality of separator bolts, a plurality of cathode plates supported by said bolts in separated, parallel position, a second framework in said housing comprising a pair of plate members held in separated position by a plurality of parallel rods, a plurality of anode wires stretched between said rods, each of said wires extending parallel to and substantially midway between an adjacent pair of cathode plates, and means for electrically insulating said frameworks from each other.

5. A detector of gamma radiation comprising a housing, a rectangular framework supported within said housing, said framework comprising a pair of plate members held in separated position by a plurality of separator bolts passing through opposite sides of said plate members, a plurality of cathode plates supported by said bolts in separated, parallel relation, a second rectangular framework at right angles to said first framework comprising a pair of plate members held in separated position by a plurality of parallel rods connected to opposite sides of the last mentioned plate members, a plurality of anode wires stretched between said rods, each of said wires extending parallel to and substantially midway between an adjacent pair of cathode plates, means for maintaining tension in each of said wires, and means for electrically insulating said frameworks from each other.

6. A radiation detector comprising a plurality of flat plates forming a cathode, means for supporting said plates in separated parallel relation, an anode wire extending back and forth midway between each adjacent pair of plates and means for supporting said wires comprising a plurality of posts disposed at opposite sides of and at right angles to said plates, each wire passing from one side of said cathode plates through the space between adjacent plates, around a post at the other side of said cathode, back through said space and around another post at the first mentioned side of said cathode and so on until each wire forms a grill-work of parallel wire sections between an adjacent pair of plates.

DONALD G. C. HARE.
GERHARD HERZOG.